United States Patent
Tran et al.

(10) Patent No.: US 8,017,658 B2
(45) Date of Patent: Sep. 13, 2011

(54) SYNTHESIS OF HYDROCARBONS VIA CATALYTIC REDUCTION OF $CO_2$

(75) Inventors: Nick E Tran, Washington, DC (US);
Dennis R Hardy, Alexandria, VA (US);
Samuel G Lambrakos, Alexandria, VA (US); John G. Michopoulos,
Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 789 days.

(21) Appl. No.: 11/850,051

(22) Filed: Sep. 5, 2007

(65) Prior Publication Data

US 2008/0051478 A1    Feb. 28, 2008

Related U.S. Application Data

(63) Continuation-in-part of application No. 11/108,149, filed on Apr. 12, 2005, now Pat. No. 7,420,004.

(60) Provisional application No. 60/562,410, filed on Apr. 15, 2004.

(51) Int. Cl.
*C07C 27/00* (2006.01)

(52) U.S. Cl. ......... 518/715; 518/700; 518/717; 518/726

(58) Field of Classification Search ............... 518/700, 518/715, 717, 726
See application file for complete search history.

(56) References Cited

U.S. PATENT DOCUMENTS

| | | | | |
|---|---|---|---|---|
| 2,637,739 A | * | 5/1953 | McGrath | 518/715 |
| 2,692,274 A | * | 10/1954 | Kolbel et al. | 518/706 |
| 5,714,657 A | * | 2/1998 | deVries | 585/310 |
| 5,776,988 A | * | 7/1998 | Chaumette et al. | 518/715 |
| 2002/0025457 A1 | * | 2/2002 | Dodd et al. | 429/9 |

* cited by examiner

*Primary Examiner* — Jafar Parsa

(74) *Attorney, Agent, or Firm* — Amy I. Ressing; Joseph T. Grunkemeyer

(57) ABSTRACT

A method of: introducing hydrogen and a feed gas containing at least 50 vol % carbon dioxide into a reactor containing a Fischer-Tropsch catalyst; and heating the hydrogen and carbon dioxide to a temperature of at least about 190° C. to produce hydrocarbons in the reactor. An apparatus having: a reaction vessel for containing a Fischer-Tropsch catalyst, capable of heating gases to at least about 190° C.; a hydrogen delivery system feeding into the reaction vessel; a carbon dioxide delivery system for delivering a feed gas containing at least 50 vol % carbon dioxide feeding into the reaction vessel; and a trap for collecting hydrocarbons generated in the reaction vessel.

15 Claims, 2 Drawing Sheets

SYNTHESIS OF HYDROCARBONS VIA CATALYTIC REDUCTION OF CO$_2$

This application is a continuation-in-part application of pending U.S. patent application Ser. No. 11/108,149, filed on Apr. 12, 2005, which claims the benefit of U.S. Provisional Patent Application No. 60/562,410, filed on Apr. 15, 2004.

FIELD OF THE INVENTION

The invention is generally related to hydrocarbon synthesis.

DESCRIPTION OF RELATED ART

There are several disadvantages to fossil fuels. First, fossil fuels are a limited resource that cannot be regenerated. Additionally, hydrocarbon fuels made from fossil fuels may contain highly undesirable sulfur, nitrogen, and aromatic compounds. When these fuels are burned, sulfur, nitrogen, and particulates are released into the air, which leads to the formation of acid rain and smog.

There are several well-established processes for direct hydrogenation of gases such as CO or CO$_2$ to produce hydrocarbon fuels. One of the most successful was developed in Germany in the 1920s by Franz Fischer and Hans Tropsch. In 1938, early German plants produced 591,000 metric tons per year, approximately 5×10$^6$ barrels per year or approximately 2×10$^8$ gallons/year, of oil and gasoline using the Fischer-Tropsch process, which reacts carbon monoxide and hydrogen with a catalyst to produce liquid hydrocarbons and water. The problem with these methods is that they use fossil fuels to produce the CO, CO$_2$, and H$_2$ used.

Additionally, well-known methods have been developed to produce methanol from carbon dioxide and hydrogen. One successful process is the Lurgi process. (See U.S. patent application Ser. Nos. 11/108,149 and 60/562,410. All referenced patent documents and publications are incorporated herein by reference). Methanol can also be used as a feedstock to produce traditional automotive gasoline. The problem with these methods is that the flash point of methanol is 11° C. and the flash point of gasoline is well below 0° C. (about −65° C.). Therefore, these methods cannot be used at sea, since the International Maritime Organization and the U.S. Navy require a minimum 60° C. flash point for all bulk flammable liquids on ships.

SUMMARY OF THE INVENTION

The invention comprises a method comprising: introducing hydrogen and a feed gas containing at least 50 vol % carbon dioxide into a reactor containing a Fischer-Tropsch catalyst; and heating the hydrogen and carbon dioxide to a temperature of at least about 190° C. to produce hydrocarbons in the reactor.

The invention further comprises an apparatus comprising: a reaction vessel for containing a Fischer-Tropsch catalyst, capable of heating gases contained therein to at least about 190° C.; a hydrogen delivery system feeding into the reaction vessel; a carbon dioxide delivery system for delivering a feed gas containing at least 50 vol % carbon dioxide feeding into the reaction vessel; and a trap for collecting hydrocarbons generated in the reaction vessel

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
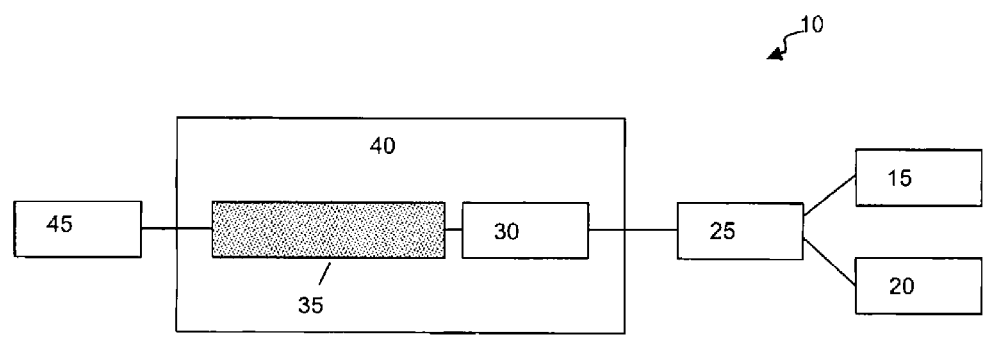
FIG. 1 schematically illustrates an apparatus for the reaction.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Current synfuel technology uses coal and natural gas as feedstocks. These feedstocks and petroleum-based fuels are the major contributors of global CO$_2$, emission. The present invention can use CO$_2$ and H$_2$ as feedstocks to produce high MW hydrocarbons, which can be turned into synfuels. These synfuels could be considered as "zero emission synfuel" or -ZES (no net CO$_2$ production). In addition, some of the high MW hydrocarbon products can be high value compounds (normally difficult to synthesize). The method may produce at least 4 generic types of relatively high MW compounds: wax, waxy aromatics, waxy condensed aromatic ring compounds, and alcohols.

The method involves the reaction of hydrogen and carbon dioxide using a Fischer-Tropsch catalyst to produce hydrocarbons. One possible reaction equation is shown below. The reaction is exothermic, with an enthalpy of about 120 kJ/mol CO$_2$.

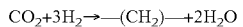

$$CO_2 + 3H_2 \rightarrow -(CH_2)- + 2H_2O$$

Fischer-Tropsch catalysts are known in the art, many of which can be found in The Fischer-Tropsch Synthesis, Robert Bernard Anderson (Academic Press, Inc., 1984) and Fischer-Tropsch Technology, Andri Steynberg and Mark Dry, eds. (Elsevier Science Publishing Company, 2004). (All referenced publications and patent documents are incorporated herein by reference.) Such catalyst include, but are not limited to, platinum group metals, ruthenium, rhodium, cobalt, nickel, iron, molybdenum, tungsten, palladium, platinum, iridium, rhenium, osmium, and any such metals on a support such as alumina, kieselguhr, zeolite, silica, and titanium dioxide. One example catalyst is a kieselguhr supported cobalt-based catalyst (KCBC) containing kieselguhr, cobalt, magnesium, thorium, and optionally potassium. KCBC may also be doped with palladium and ruthenium.

The hydrogen and carbon dioxide can be introduced into the reactor in gaseous form. The carbon dioxide feed gas contains at least 50, 75, 90, or 99 vol % carbon dioxide. Any means of delivering the gas may be used, including but not limited to, from a gas cylinder or as the product of another process. For example, the hydrogen may be extracted from water or seawater by electrolysis. The carbon dioxide may be extracted from the ambient air or from sea water. When the hydrocarbons that are made from the process are subsequently combusted, carbon dioxide is produced, which may be used as the feedstock carbon dioxide. Hydrogen and carbon dioxide that are not directly derived from fossil fuels may be used. As used herein, carbon dioxide in the ambient atmosphere or environment is not considered to be directly derived from fossil fuels.

The reaction may take place with little to no carbon monoxide or methanol in the feed gas. The carbon monoxide concentration may be no more than about 10 ppm, 1 ppm, 0.5 ppm, or 0.2 ppm. Commercially available carbon dioxide tanks typically contain less than 0.2 ppm carbon monoxide. The concentration of methanol may be no more than about 10 ppm or 1 ppm. The reaction may occur in a single vessel in one step.

The hydrogen and carbon dioxide are heated to at least about 190° C. The heating may occur in the reactor or before the gas is introduced into the reactor. The temperature used may be at least partially dependent on the gas pressure. Generally, a higher gas pressure may require a lower temperature. There is no upper limit on the pressure, as long as the hydrogen and carbon dioxide remain in gas form, and may, for example, be as high as thousands of psi. One suitable reaction condition is a temperature of about 190° C. to about 220° C. with hydrogen gas pressure of about 250 to about 300 psi (at room temperature). The hydrogen gas pressure may be about 2.8 to about 3.2, including 3, times the carbon dioxide gas pressure to have about a 3:1 stoichiometric ratio.

The hydrocarbons can be collected in a trap and cooled to liquid or solid form. The product may be a waxy substance containing high molecular weight hydrocarbons. The hydrocarbons may contain hydroxyl, carbonyl, and carboxyl groups. The waxy material can be refined to produce hydrocarbon fuels. The synthesis and combustion of these fuels produces a net zero emission of $CO_2$, as well as zero emissions of $SO_x$ if there is no sulfur contamination. The hydrocarbons may be produced and refined at the point of use, for example, at sea.

Having described the invention, the following examples are given to illustrate specific applications of the invention. These specific examples are not intended to limit the scope of the invention described in this application.

Example 1

Synthesis of KCBC—Magnesium powder (Mg, 10.0 g, Fischer Scientific Company, 70-80 mesh) was reacted with enough nitric acid ($HNO_3$) to form $Mg(NO_3)_2.6H_2O$. The colorless crystalline product was dried and weighed. A first solution of 49.4 g $Co(NO_3)_2.6H_2O$ (Fischer Scientific Company, 99.8% purity), 11.0 g $Mg(NO_3)_2.6H_2O$, and 1.5 g $Th(NO_3)_4.4H_2O$ (Fischer Scientific Company, 99.9% purity) in 250 mL water was prepared by boiling. A second solution of 35.0 g $K_2CO_3$ (Allied Chemical & Dye Corp., ACS Grade) in 250 mL water was prepared by boiling. The first solution was added to the second and stirred. Keiselguhr (6.7 g, Alfa, −325 mesh powder) was added to the combined solutions and stirred for 10 minutes to make KCBC. The KCBC powder was filtered and washed with distilled water until the pH of the eluate was 8.0. (It is possible that the potassium was removed in the washing process.) The powder was dried under vacuum at 120° C. for 16 hours, calcined at 350° C. for 16 hours, and reduced with 300 psi of hydrogen gas at 350° C. for 16 hours. The final product was a black powder.

Example 2

Reaction apparatus—FIG. 1 schematically illustrates an example apparatus 10. Hydrogen delivery system 15 and carbon dioxide delivery system 20 feed into a gas mixer 25. The gases then feed into a gas heater 30, then into a column 35 containing the catalyst. The gas heater 30 and column 35 are inside a temperature controlled oven 40. The synthesized hydrocarbons are collected in a trap 45.

Example 3

Figure 2:
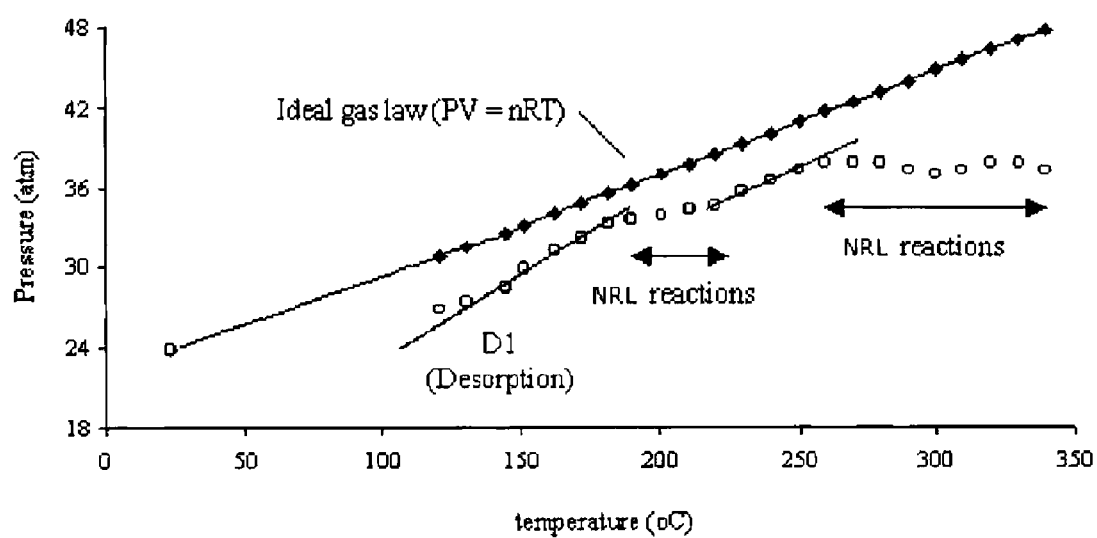
FIG. 2 shows a plot of temperature vs. pressure for determining suitable reaction conditions.

Determination of suitable reaction temperature—Using the apparatus described in Example 2, the gas mixer was pressurized with 270 psi $H_2$ (Messer MG Industries) and 90 psi $CO_2$ (Matheson Gas). KCBC was placed into the column. The gases were introduced into column and the column was sealed. The temperature inside the container was increased to 350° C. in 5° C. increments. The pressure at each increment was recorded once the pressure stabilized. FIG. 2 shows a plot of temperature vs. pressure compared to the ideal gas law. The change in the slope from 190-220° C. shows that the gas is being consumed to form hydrocarbons such as a wax. At a higher temperature range of 250-340° C., liquid and gas hydrocarbons such as methane were formed.

Example 4

Synthesis of hydrocarbons—Using the apparatus described in Example 2, the gas mixer was pressurized with 270 psi $H_2$ and 90 psi $CO_2$. KCBC was placed into the column. The gases were introduced into column and the column was sealed. The temperature inside the container was increased to 210° C. The trap was cooled with a solution of isopropanol (IPA) and dry ice. The conditions were maintained for 2 hours, after which a waxy substance was removed from the trap.

Example 5

Figure 3:
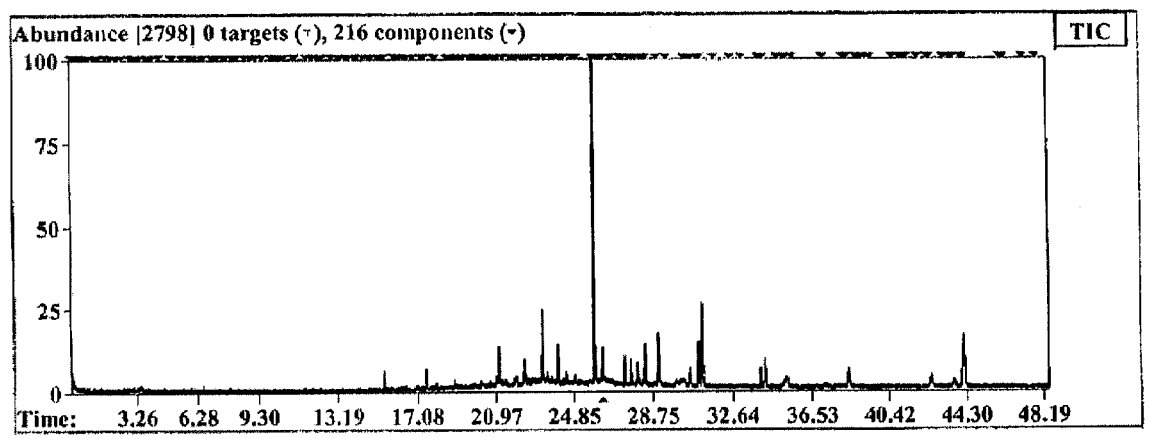
FIG. 3 shows the results of GC/MS analysis of the hydrocarbons.

Analysis of hydrocarbons—GC/MS analysis (Hewlett Packard 5890 series II gas chromatograph) was performed on the waxy substance from Example 4, and is shown in FIG. 3. The molecular weights of the hydrocarbons are in the range of those produced by typical Fischer-Tropsch processes. The peak occurred at $C_{27}$, as is typical in Fischer-Tropsch synthesis. The hydrocarbons may be aliphatic or aromatic, including such compounds as 1,6-dimethyl-4-isopropylnaphthalene, n-propylbenzene, 2-(1-propenyl)naphthalene, 1-nonylphenalene, 2-t-butylphenalene, (14-methyl)pentadecylbenzene, and 1-phenyl-4-undecen-3-ol.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A method comprising:
   introducing hydrogen and a feed gas containing at least 50 vol % carbon dioxide into a reactor containing a Fischer-Tropsch catalyst; and
   heating the hydrogen and carbon dioxide to a temperature of at least about 190° C. to produce hydrocarbons in the reactor;
   wherein the catalyst is a kieselguhr supported catalyst comprising cobalt, potassium, thorium, and magnesium.

2. The method of claim 1, wherein the feed gas contains no more than 10 ppm carbon monoxide.

3. The method of claim 2, wherein the feed gas contains no more than 10 ppm methanol.

4. The method of claim 1, wherein the hydrogen and carbon dioxide are introduced into the reactor as gases.

5. The method of claim 4, wherein the gas pressure of the hydrogen is from about 2.8 to about 3.2 times the gas pressure of the carbon dioxide.

6. The method of claim 5, wherein the gas pressure of the hydrogen is from about 250 to about 300 psi at room temperature.

7. The method of claim 6, wherein the heating is to about 190° C. to about 220° C.

8. The method of claim 1, further comprising:
collecting the hydrocarbons in a trap; and
cooling the hydrocarbons to liquid or solid form.

9. The method of claim 1, further comprising:
extracting the hydrogen from water.

10. The method of claim 1, further comprising:
extracting the hydrogen from seawater.

11. The method of claim 1, further comprising:
extracting the carbon dioxide from seawater.

12. The method of claim 1, further comprising:
extracting the carbon dioxide from air.

13. The method of claim 1, further comprising:
extracting the carbon dioxide from combustion of the hydrocarbons.

14. The method of claim 1, wherein the hydrogen and carbon dioxide are not derived from fossil fuels.

15. The method of claim 1, wherein the feed gas contains at least 90 vol % carbon dioxide.

* * * * *